United States Patent [19]

Tizac

[11] Patent Number: 5,002,241

[45] Date of Patent: Mar. 26, 1991

[54] TILTING STICK CONTROL DEVICE AND A FLIGHT CONTROL SYSTEM FOR AIRCRAFT COMPRISING AT LEAST ONE SUCH CONTROL DEVICE

[75] Inventor: Pierre Tizac, Tournefeuille, France

[73] Assignee: Aerospatiale Societe Nationale Industrielle, Paris, France

[21] Appl. No.: 472,247

[22] Filed: Jan. 30, 1990

[30] Foreign Application Priority Data

Feb. 17, 1989 [FR] France ................................ 89 02116

[51] Int. Cl.$^5$ ...................... B64C 13/12; B64C 13/04; B64C 13/46; G05G 9/00
[52] U.S. Cl. .................................. 244/237; 244/223; 244/229; 74/471
[58] Field of Search ................... 244/75 R, 76 A, 175, 244/220, 221, 223, 228, 229, 236, 237; 74/471

[56] References Cited

U.S. PATENT DOCUMENTS

| | | | |
|---|---|---|---|
| 3,149,806 | 10/1964 | De Boy et al. | 244/236 |
| 3,771,037 | 11/1973 | Bailey | 244/237 |
| 3,776,058 | 12/1973 | French | 74/471 XY |
| 4,046,005 | 9/1977 | Goroski | 244/236 |
| 4,555,960 | 12/1985 | King | 74/471 XY |
| 4,825,157 | 4/1989 | Mikan | 74/471 XY |

FOREIGN PATENT DOCUMENTS

| | | |
|---|---|---|
| 0204598 | 12/1986 | European Pat. Off. . |
| 2632770 | 12/1989 | France ................................ 244/237 |
| 2073114 | 10/1981 | United Kingdom . |

Primary Examiner—Sherman Basinger
Assistant Examiner—Virna Lissi Mojica
Attorney, Agent, or Firm—Fisher, Christen & Sabol

[57] ABSTRACT

Device for controlling elements of a machine, comprising a stick intended to be actuated by a single hand of an operator and mounted for tilting about at least one axis transversal to said stick, said stick being associated with at least one position sensor and delivering an electric signal representative of tilting of said stick about said axis, on each side of a neutral position, said electric signal controlling at least one actuator which controls at least one of said elements of the machine. This device is characterized in that said stick is mounted for rotation on itself about its longitudinal axis and in that it comprises at least one other position sensor delivering another electric signal representative of rotation of said stick about itself, on each side of a neutral position, said other electric signal controlling at least one other actuator which controls at least one other element of said machine.

7 Claims, 4 Drawing Sheets

TILTING STICK CONTROL DEVICE AND A FLIGHT CONTROL SYSTEM FOR AIRCRAFT COMPRISING AT LEAST ONE SUCH CONTROL DEVICE

BACKGROUND OF THE INVENTION

The present invention relates to a tilting stick control device as well as an aircraft flight control system comprising such a control device.

Although not exclusively, it applies more particularly to aircraft piloting systems and it will be more specially described hereafter with reference to such an application, it of course being understood that no limitation of the scope of the invention can result therefrom.

Numerous machines, such as aircraft, helicopters, tanks, public works machines, etc. . . , are provided with a set of controlled elements which can be operated from one or other of two pairs command stations, controlled by two separate operators, called pilot and copilot in the case of vehicles, and each equipped with a stick type control member, articulated so as to pivot in any direction. These control members are connected to said members to be controlled and are coupled together so that each of said operators has available the set of controls for said members to be controlled and so that voluntary tilting by direct operation of one of said control members by an operator causes an identical induced tilting in the same direction of the other.

Up to present, the transmission of the control orders between a stick actuated by an operator and a device to be controlled has taken place mechanically so that said sticks were of relatively large sizes and capable of withstanding and transmitting high mechanical forces. Such sticks were therefore provided so as to be disposed in front of said operators, held in both hands by each operator and actuated by his forearm, the amplitude and intensity of their movements being conditioned by the resistances to overcome for operating the mechanical controls.

However, mechanical controls are more and more often replaced by electric controls which have numerous advantages, for example in so far as the weight, size, maintenance, accommodation of complex control laws etc. . . are concerned. The result is that said sticks are connected to and associated with electric sensors which detect the variations of position of said sticks and which control electric controls actuating said controlled devices depending on the indications of said sensors. Under these conditions, said sticks only transmit very small forces and their dimensions and mechanical strength may be considerably reduced. Thus, small size sticks have been designed and used, called ministicks which can be held and actuated by one hand by an operator.

In addition to the above advantages concerning the use of electric controls, such ministicks free the space in front of the operators for optimizing the grouping together of other controls in front of them, so that each ministick is disposed laterally with respect to said operators. In addition, particularly when the two command stations of the operators are parallel (which is generally the case in a vehicle in which said stations are disposed facing forwards), in order to comply with the symmetry of the machine with respect to an axis passing between said stations, one of the ministicks is dispose on the left of the left-hand operator and the other on the right of the right-hand operator. In such a case, the left-hand operator therefore holds the associated ministick with his left hand, whereas the right-hand operator holds his with his right hand.

When such known ministicks are applied to the control of an aircraft, front to rear and rear to front tilting is used for controlling pitching (elevation) whereas the left to right and right to left tilting is used for controlling the aircraft in rolling. However, no other movement of the ministick is available for yaw control (direction). Therefore, in known aircraft with electric flight control, the yaw control remains mechanical, using a conventional rudder bar.

SUMMARY OF THE INVENTION

The object of the present invention is to overcome this drawback and in particular to make possible the electric yaw control of an aircraft, from a ministick, namely doing away with such a rudder bar on board said aircraft.

For this, in accordance with the invention, the device for controlling the elements of a machine, comprising a stick intended to be actuated by a single hand of an operator and mounted for pivoting about at least one axis transversal to said stick, said stick being associated with at least one position sensor delivering an electric signal representative of tilting of said stick about said axis, on each side of a neutral position, said electric signal commanding at least one actuator which controls at least one of said elements of the machine, is remarkable in that said stick is mounted for rotation on itself about its longitudinal axis and in that it comprises at least one other position sensor delivering another electric signal representative of rotation of said stick about itself, on each side of a neutral position, said other electric signal commanding at least one actuator which controls at least one other element of said machine.

Thus, said other position sensor is able to control one or more additional elements of the machine which could not be controlled from tilting said stick.

In the known case mentioned above in which said stick is mounted for pivoting about a first and second axis, which axes intersect and are transversal to said stick, so that the latter may pivot about the intersection point of said first and second axes, at least a first and second position sensors being provided for delivering a first and second electric signal respectively representative of tilting of said stick about said first and said second axes, the device of the invention is remarkable in that it comprises a rotary shaft with which at least one third position sensor is associated which delivers a third electric signal representative of rotation of said shaft about its axis and in that said stick is articulated to said shaft so as to be able to pivot about said intersection point of said first and second axes.

Thus, in the particular application to the control of an aircraft, tilting of said stick about said first and second axes being used for controlling the aircraft in pitching and rolling, the rotation of the stick may be used for controlling the aircraft in yawing: It is then possible to omit the usual rudder bar provided for this purpose. In an advantageous embodiment, said stick and said rotary shaft are articulated by means of a universal joint, said rotary shaft is mounted so as to be prevented from moving parallel to its axis, said stick passes through a sleeve to which it is mounted, with a small play, so as to rotate on itself, and said sleeve is fast with a plate or similar cooperating with said first and second position sensors.

Such an embodiment may comprise a block with respect to which said rotary shaft is mounted coaxially and said first and second position sensors peripherally, said universal joint being provided at one of the ends of said shaft projecting outside said block, whereas the third sensor or sensors are provided at the opposite end of said rotary shaft. Thus, a device is obtained of small size and low weight.

Preferably, said sleeve is prevented from rotating about the axis of said rotary shaft.

In the case where, in a way known per se in ministick control devices, force sensation devices are associated with tilting of stick about said first and second axes and intended to provide a certain resistance to actuation of the ministick by the operator, it is advantageous for these force sensation devices to be fixed to said block. Similarly, it is advantageous to provide at least one force sensation device associated with rotation of the ministick on itself. The latter member may also be fixed to said block.

The present invention also relates to a flight control system intended for an aircraft comprising pitch control surfaces, roll control surfaces and yaw control surfaces. In accordance with the invention, such a system comprises at least one control device of the above type, having a stick mounted for tilting about a first and second axis, which axes intersect and are transversal to said stick, so that the latter may tilt about the intersection point of said first and second axes, at least a first and second position sensor being provided for delivering a first and second electric signal respectively representative of tilting of said stick about said first and second axes, and this system is remarkable in that said device comprises a rotary shaft with which at least a third position sensor is associated and which is capable of delivering a third electric signal representative of rotation of said shaft about its axis, in that said stick is articulated to said shaft so as to be able to tilt about said intersection point of said first and second axes and in that said pitch and roll control surfaces are controlled by said first and second position sensors, whereas said yaw control surface is controlled by said third position sensor.

It will be noted that such a flight control system may be advantageously of the type in which one or more flight computers are provided, since all the control orders for the control surfaces are in electric form.

Generally, two control devices of the above type may be provided, one for the pilot and the other for the copilot. In this case, said first, second and third signals coming from the two control devices are fed to said flight computer(s) which deliver single control orders to the corresponding control surfaces.

BRIEF DESCRIPTION OF THE DRAWINGS

The invention will be well understood from the figures of the accompanying drawings.

Throughout these figures, identical references designate similar elements.

DESCRIPTION OF THE PREFERRED EMBODIMENTS

Figure 1:
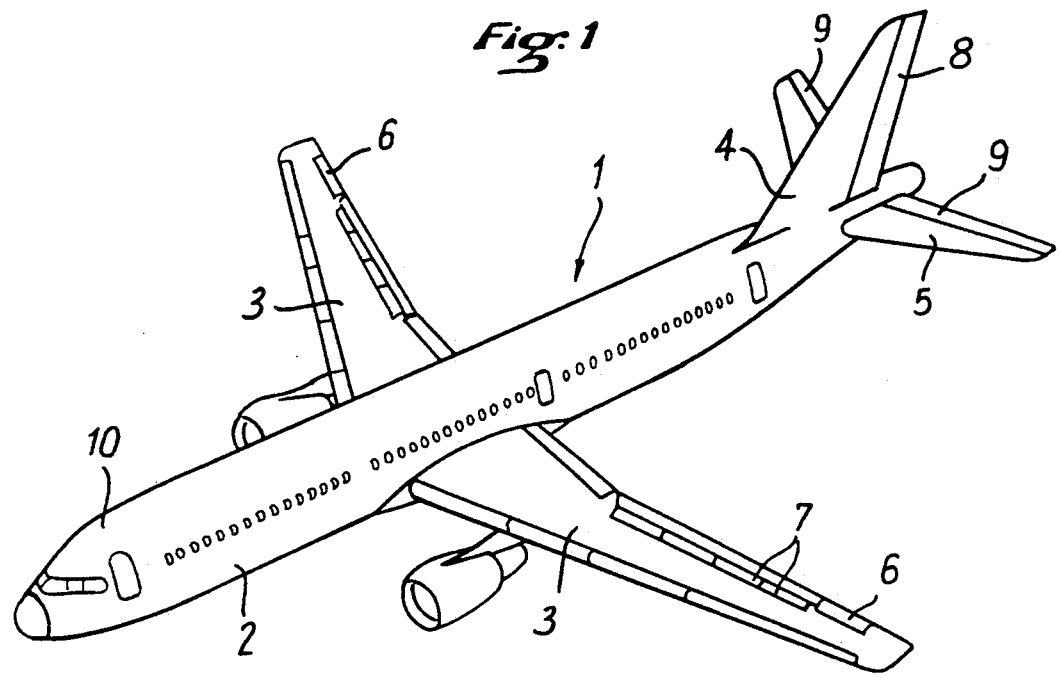
FIG. 1 shows in a top perspective view a heavy civil transport aircraft, illustrating more particularly the roll, pitch and yaw control surfaces.

The heavy civil transport aircraft shown in perspective in FIG. 1, comprises a fuselage 2, wings 3, a vertical stabilizer 4 and a horizontal stabilizer 5.

On the wings 3 trailing edge ailerons 6 are provided for roll control and roll deflectors 7. On the vertical stabilizer 4 a rudder 8 is provided, and elevators 9 are articulated to the trailing edge of the horizontal stabilizer 5.

Figure 2:
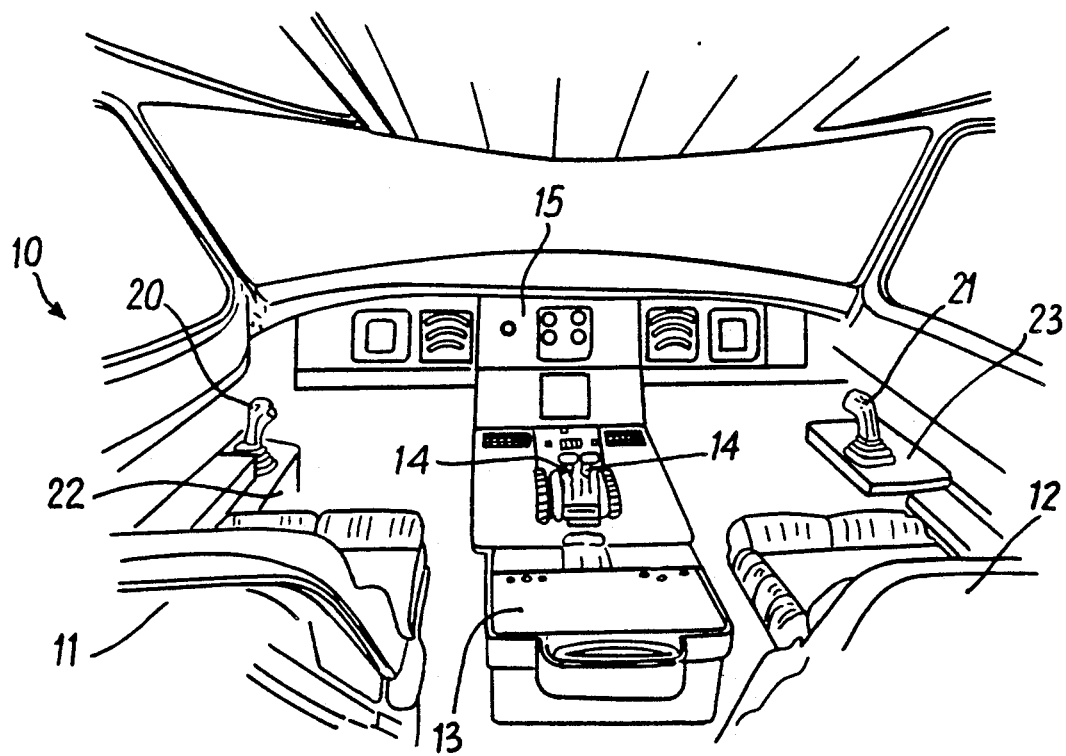
FIG. 2 is a partial perspective view of the inside of the piloting cabin of the aircraft of FIG. 1.

In FIG. 2, the inside of the piloting cabin 10 of aircraft 1 has been shown schematically and partially, in a perspective axial view from rear to front, comprising a seat 11 for a pilot and a seat 12 for a copilot. Generally, the seat for the pilot is on the left, whereas that for the copilot is on the right. The two piloting seats are separated from each other by a central console 13 having a plurality of control and checking devices, such as throttle control handles 14. Furthermore, on the control panel 15 different checking devices are provided. It will be noted that, in the piloting cabin 10 shown in FIG. 2, the two usual piloting sticks situated in front of the pilot and the copilot respectively, and intended to be held and operated by both hands, have been omitted. These usual sticks, of a large size, have been replaced by simple pivoting handles 20 and 21, disposed respectively at the left of the pilot and at the right of the copilot; thus, handle 20 is intended to be operated by the left hand of the pilot and handle 21 by the right hand of the copilot. For example (see also FIGS. 3 and 4), the aircraft is controlled in pitching by tilting handle 20, or handle 21, parallel to the median longitudinal plane of the aircraft about a transverse axis X—X and in rolling by tilting one of said handles laterally, transversely to said median longitudinal plane, about a longitudinal axis Y—Y. As will be seen hereafter, each handle may, from a neutral position N, be tilted forwards (arrow FAV), rearwards (arrow FAR), to the right (arrow FD) and to the left (arrow FG).

The handles 20 and 21 are called "ministicks" and, as will be clear hereafter, are electrically coupled so that the aircraft can be piloted from one or other of them or both.

Figure 3:
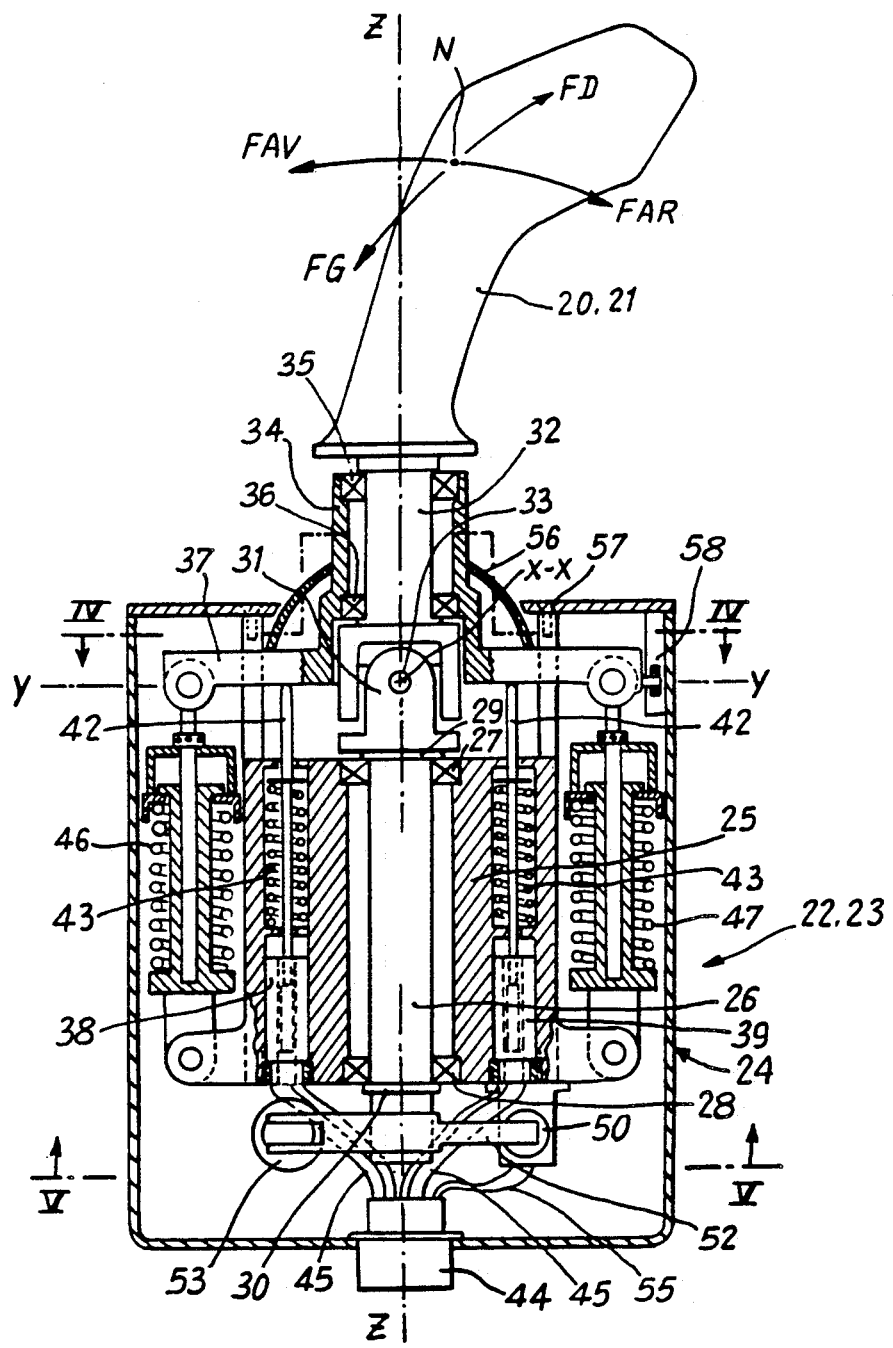
FIG. 3 is an axial section of one embodiment of the ministick control device in accordance with the present invention.
Figure 4:
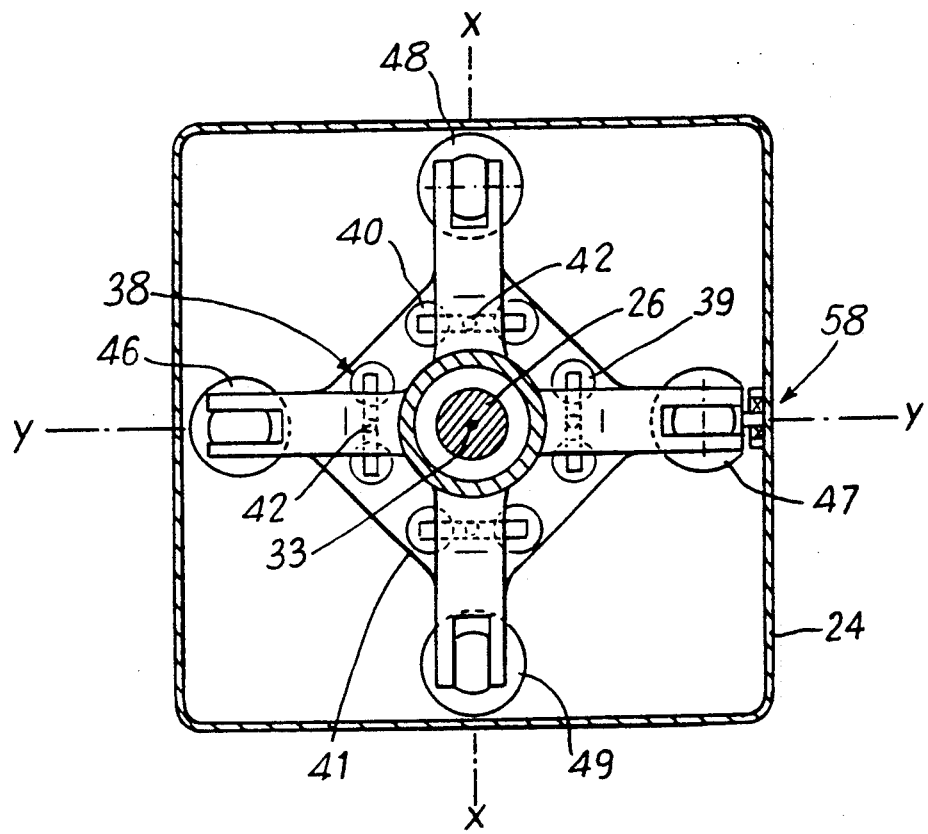
FIG. 4 is a section through line IV—IV of FIG. 3, the flexible sealing cover being assumed removed.

As shown in FIG. 3, each handle 20, 21 is associated with a mechanism 22 or 23, respectively. Each of these mechanisms 22, 23 comprises, in a case 24, a fixed block 25. This block has a shaft 26 passing therethrough which may rotate about its axis Z—Z with respect to block 25 on bearings 27 and 28 but which is prevented from moving with respect to said block, particularly by means of axial stops 29 and 30. The two ends of shaft 26 project outside said block 25.

At one of its ends shaft 26 is connected, by a universal joint 31, to an auxiliary shaft 32 fast with handle 20 or 21. The point of articulation 33 of joint 31 merges with the intersection of axes X—X, Y—Y and Z—Z.

The auxiliary shaft 32 is surrounded by a sleeve 34, with respect to which it may rotate on bearings 35 and 36. Opposite block 25, said sleeve 34 is fast with a member 37, such as a plate, cross or similar, able to cooperate with position sensors 38–41 disposed in twos symmetrically about the axis Z—Z, respectively, in the planes X,X—Z,Z and Y,Y—Z,Z.

For example, the position sensors 38–41 are of the transformer type with plunger core, the latter being fast with a needle 42 urged outwardly by a spring 43. Thus, the end of needles 42 of sensors 38 to 41 bears against the face of member 37, in the form of a plate, cross or similar, opposite the auxiliary shaft 32 and handle 20 or 21. In the neutral position N of the latter, sensors 38 to 41 are adjusted so as to emit no signal. Said sensors are supplied with power and the signals which they are likely to emit are taken off through a plug 44, which is fixed to case 24 and to which said sensors are connected by conductors 45.

Furthermore, member 37 is prevented from rotating about the axis Z—Z by a sliding connection 58, which does not prevent it from tilting about axes X—X and Y—Y.

Between block 25 and member 37 a spring suspension may be disposed comprising for example four spring devices 46–49, disposed in twos symmetrically about axis Z—Z. The purpose of such a spring suspension is to introduce a sensation of force during tilting of handle 20, 21, as well as bringing it back to the neutral position when it is released.

Figure 5:
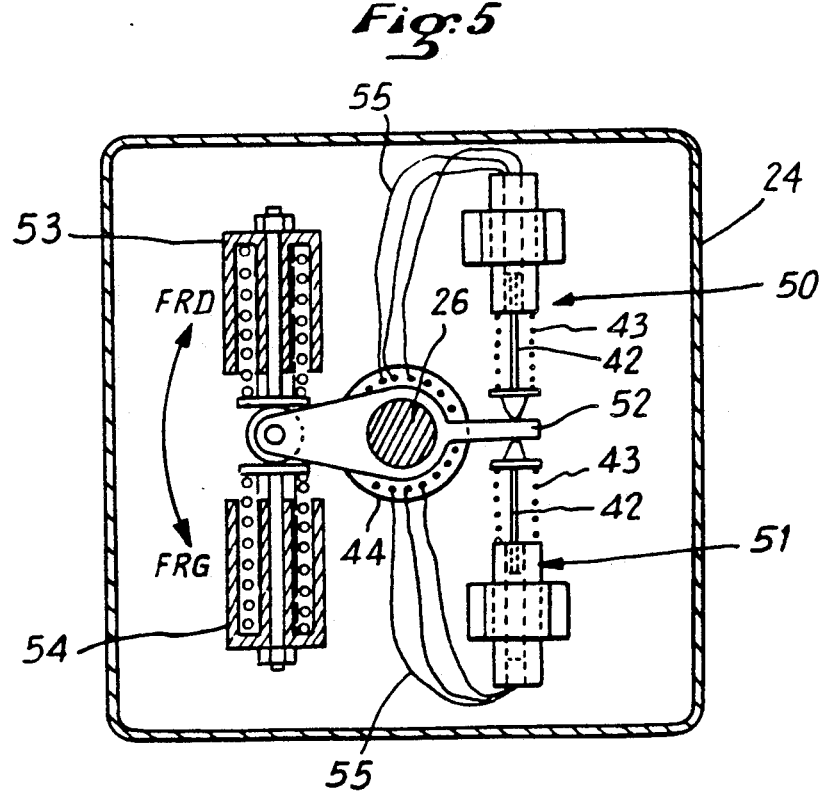
FIG. 5 is a simplified section through line V—V of FIG. 3.

As can be seen in FIGS. 3 and 5, the end of shaft 26, opposite joint 31, cooperates with two position sensors 50 and 51, for example of the same type as sensors 38 to 41, capable of delivering a signal representative of the amplitude and of the direction of rotation of shaft 36 about its axis Z—Z (arrows FRG and FRD). For example, for this, a blade 52 is fixed to shaft 26, transversely thereto, and said sensors 50 and 51 bear by their needles 42, urged by springs 43, against the opposite faces of said blade 52.

Two force sensation devices 53 and 54, for example spring loaded, introduce a certain resistance to voluntary rotation of shaft 26 about its axis Z—Z and automatically bring the shaft back to its neutral position of rotation.

The connection between said devices 53 and 54 and shaft 26 may be similar to that provided between the latter and sensors 50 and 51.

Of course, sensors 50 and 51, as well as devices 53 and 54, may be carried by block 25. Sensors 50 and 51 are connected to plug 44 by power supply and signal take-off wires 55.

A flexible cover 56, surrounding sleeve 34, provides sealing between the latter and the upper plate 57 of case 24, through which said sleeve passes.

Figure 6:
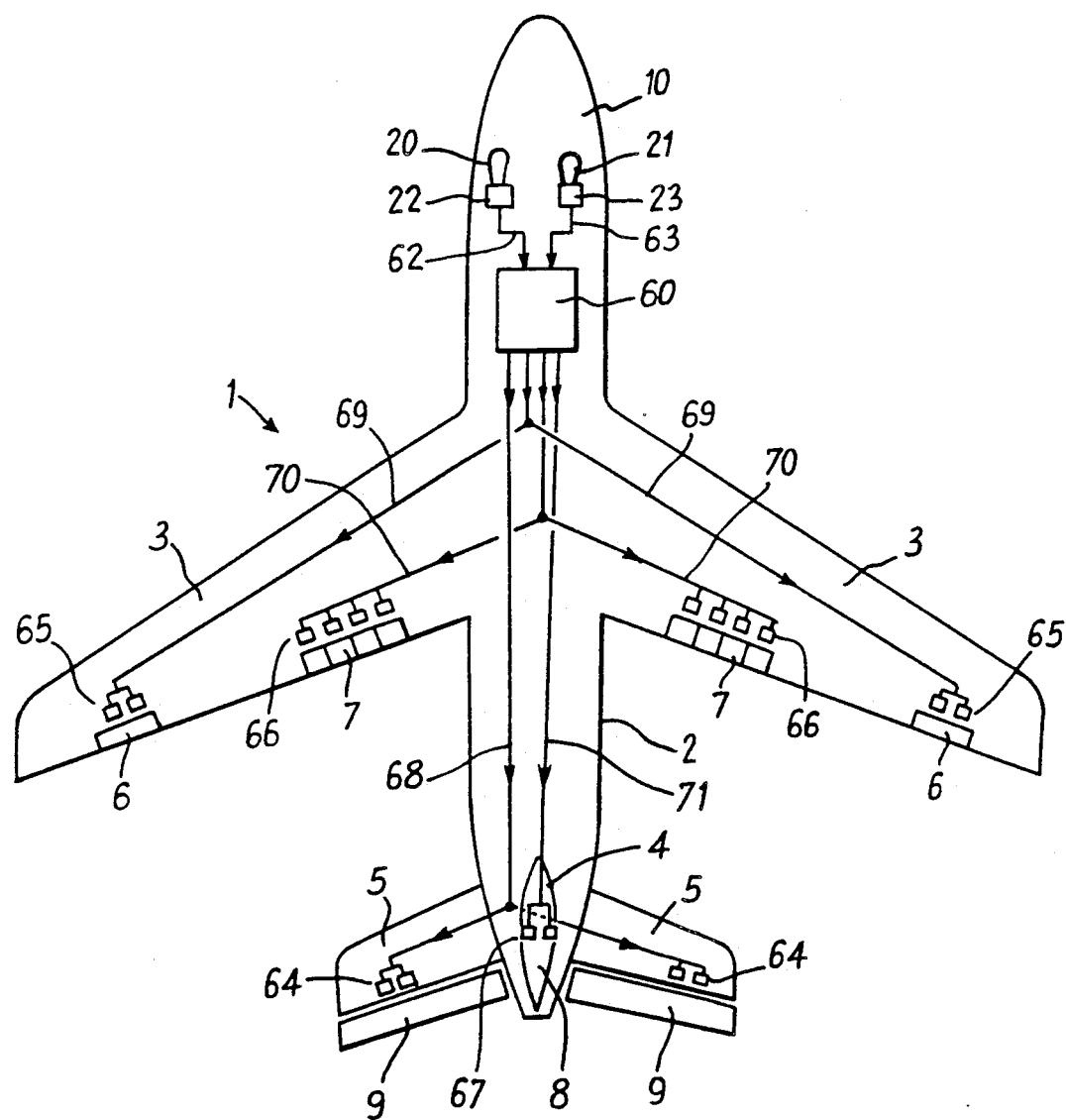
FIG. 6 illustrates schematically the flight control system in accordance with the invention for the aircraft of FIG. 1.

In the diagram of the flight control system illustrated in FIG. 6, flight computers 60 are provided to which the control devices 22 and 23 are connected by means of lines 62 and 63 connected to the plugs 44 of said devices. Furthermore, electric servocontrols 64 are provided for controlling the pitch control surfaces 9, electric servocontrols 65 and 66 respectively for controlling the ailerons 6 and the roll deflectors 7 and electric servocontrols 67 for controlling the rudder 8. The electric servocontrols 64, 65, 66 and 67 are controlled by the flight computer to which they are connected respectively by lines 68, 69, 70 and 71.

Thus, if the pilot (not shown) tilts stick 20, 32 forwards about axis X—X (arrow FAV) with his left hand, the stick pivots about point 33 and shaft 32 causes sleeve 34 to tilt, to which it is mechanically connected by bearings 35 and 36. Consequently, member 37 tilts about axis X—X, against the resilient action of the force sensation device 46, and drives needle 42 of sensor 38. The latter then delivers at its output a signal representative of tilting of stick 20, 32 and this signal is transmitted to the flight computers 60 through conductors 45, plug 44 and line 62. From this signal the computers 60 provide a dive control signal for the pitch control surfaces 9 which is fed to the electric servocontrol 64 over line 68.

It will be readily understood, from what has just been described, that a nose-up control signal for control surfaces 9 may be obtained similarly by tilting stick 20, 32 rearwards, about axis X—X (arrow FAR), through the cooperation of member 37 and sensor 39.

Similarly, a roll control signal, to the left or the right, fed to the electric servocontrols 65 and/or 66 of flap 6 and of the roll deflectors 7 by computers 60 and lines 69, 70, may be obtained by tilting stick 20, 32 about the axis Y—Y (arrows FG and FD). In this case, member 37 which is connected to sleeve 34 which is caused to tilt by stick 20, 32, cooperates with sensors 40 and 41 to deliver a roll signal which is fed to computers 60 over line 62. It can be seen then that tilting of stick 20, 32 makes it possible to control aircraft 1 in pitching and rolling.

Now, if the pilot rotates handle 20 on itself, the auxiliary shaft 32 rotates with respect to sleeve 34, which drives shaft 26 in rotation about axis Z—Z.

Blade 52 therefore rotates about said axis, against the action of one of the force sensation devices 53 or 54, and drives in needle 42 of one of sensors 50 or 51. A signal corresponding to this rotation is emitted by said sensor and fed to computers 60 over conductors 55, plug 44 and line 62.

Computers 60 then form from this signal a direction control signal (yaw) which is fed to the electric servocontrol 67 over line 71. A left or right yaw order (arrows FRG and FRD) are associated respectively with both directions of rotation of handle 20 on itself.

Device 22 therefore allows the aircraft to be controlled also in yawing.

In the case where the pilot and the copilot send control orders at the same time to computers 60, by simultaneous actuation of handles 20 and 21, said computers 60 would deliver, from said orders, a single control instruction which is fed fed to the corresponding electric servocontrol 64 to 67 and formed in accordance with a program pre-recorded in said computers.

It can then be seen that with the invention a compact tilting stick control device is obtained of light weight and able to control all the manoeuvres of an aircraft. This control device has only small free motion and low friction and its elements may be mounted under pre-stressing.

What is claimed is:

1. A flight control system intended for an aircraft comprising pitch control surfaces, roll control surfaces and yaw control surfaces, said system comprising at least one control device having a stick mounted for tilting about a first and second axis, which axes intersect and are transversal to said stick, so that the latter may tilt about the intersection point of said first and second axes, at least a first and second position sensor being provided for delivering a first and second electric signal respectively representative of tilting of said stick about said first and said second axis, said stick being mounted for rotation on itself about its longitudinal axis and said device comprising at least a third position sensor delivering a third electric signal representative of rotation of said stick about itself, said pitch and roll control surfaces being controlled by said first and second position sensors, whereas said yaw control surface is controlled by said third position sensor, wherein said device further comprises a rotary shaft with which said third position sensor is associated and said stick is articulated to said shaft so as to be able to tilt about said intersection point of said first and second axes, a rotary sleeve through which said rotary shaft passes with respect to which it is mounted, with a small play, so as to rotate on itself, said stick and said rotary shaft being articulated by means of a universal joint, said rotary shaft being mounted so as to be prevented from moving parallel to its axis, said rotary sleeve being fast with a plate or similar mechanism cooperating with said first and second position sensors; and a block with respect to which said rotary shaft is mounted centrally and said first and second position sensors peripherally, said universal joint being provided at one of the ends of said shaft projecting outside said block, whereas a third sensor is provided at the opposite end of said rotary shaft.

2. The system as claimed in claim 1, comprising one or more flight computers and two such control devices, one for the pilot and the other for a copilot, wherein said first, second and third signals from the two control devices are fed to said flight computer which deliver single command orders to the corresponding control surfaces.

3. A device for controlling the elements of a machine, comprising a stick intended to be actuated by a single hand of an operator and mounted for pivoting about a first and a second axis, which axes intersect and are transversal to said stick, so that the latter may tilt about the intersection point of said first and second axes, at least a first and second position sensor being provided for delivering a first and second electric signal respectively representative of tilting of said stick about said first and said second axis, said electric signals each commanding at least one actuator which controls at least one of said elements of the machine, said stick being mounted for rotation on itself about its longitudinal axis and the device comprising at least a third position sensor delivering a third electric signal representative of rotation of said stick about itself, said third electric signal commanding at least one other actuator which controls at least one other element of said machine, which device further comprises a rotary shaft with which said third position sensor is associated and said stick is articulated to said shaft so as to be able to tilt about said intersection point of said first and second axes, a rotary sleeve through which said rotary shaft passes with respect to which it is mounted, with a small play, so as to rotate on itself, said stick and said rotary shaft being articulated by means of a universal joint, said rotary shaft being mounted so as to be prevented from moving parallel to its axis, said rotary sleeve being fast with a plate or similar mechanism cooperating with said first and second position sensors, and a block with respect to which said rotary shaft is mounted centrally and said first and second position sensors peripherally, said universal joint being provided at one of the ends of said rotary shaft projecting outside said block, whereas a third sensor is provided at the opposite end of said rotary shaft.

4. The device as claimed in claim 3, wherein said sleeve is prevented from rotating about the axis of said rotary shaft.

5. The device as claimed in claim 3, comprising force sensation devices associated with tilting of said stick about said first and second axes, wherein said force sensation devices are fixed to said block.

6. The device as claimed in claim 3, comprising at least one force sensation device associated with rotation of the stick on itself.

7. The device as claimed in claim 6, wherein said force sensation device associated with rotation of the stick on itself is fixed to said block.

* * * * *